United States Patent
Kawahara

(10) Patent No.: US 8,079,260 B2
(45) Date of Patent: Dec. 20, 2011

(54) FALL DETECTION APPARATUS

(75) Inventor: Hideo Kawahara, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 12/180,381

(22) Filed: Jul. 25, 2008

(65) Prior Publication Data

US 2009/0031808 A1 Feb. 5, 2009

(30) Foreign Application Priority Data

Jul. 30, 2007 (JP) ................................. 2007-197395

(51) Int. Cl.
*G01P 15/00* (2006.01)
*G01P 3/00* (2006.01)
*G01B 21/02* (2006.01)

(52) U.S. Cl. ............................. 73/510; 360/75; 702/141

(58) Field of Classification Search .................... 73/510, 73/514.01, 514.35; 360/75, 110; 702/141, 702/142, 150–153, 189
See application file for complete search history.

(56) References Cited

U.S. PATENT DOCUMENTS

| | | | |
|---|---|---|---|
| 7,191,089 B2* | 3/2007 | Clifford et al. | 702/141 |
| 7,382,567 B2* | 6/2008 | Liao et al. | 360/75 |
| 7,395,709 B2* | 7/2008 | Noda et al. | 73/510 |
| 7,415,380 B2* | 8/2008 | Suzuki | 702/142 |
| 7,450,332 B2* | 11/2008 | Pasolini et al. | 360/75 |
| 7,451,057 B2* | 11/2008 | Kim et al. | 702/141 |
| 7,549,335 B2* | 6/2009 | Inoue et al. | 73/510 |
| 7,551,388 B2* | 6/2009 | Horiguchi et al. | 360/75 |
| 7,613,587 B2* | 11/2009 | Starodubtsev et al. | 702/150 |
| 7,690,253 B2* | 4/2010 | Noda et al. | 73/510 |
| 7,802,476 B2* | 9/2010 | Lasalandra et al. | 73/514.32 |
| 7,865,253 B2* | 1/2011 | Harrington | 700/21 |

FOREIGN PATENT DOCUMENTS

| | | |
|---|---|---|
| JP | 2003-263853 A | 9/2003 |
| JP | 2007-179667 A | 7/2007 |

* cited by examiner

*Primary Examiner* — Helen C. Kwok

(57) ABSTRACT

An electronic apparatus includes an acceleration detection unit configured to detect acceleration acting on the electronic apparatus, a noise removal unit configured to remove a noise component from an output of the acceleration detection unit, a first determination unit configured to determine whether output from the noise removal unit indicates acceleration equal to or less than a first acceleration, a second determination unit configured to determine whether output from the noise removal unit indicates acceleration equal to or less than a second acceleration, and a fall state determination unit configured to determine that the electronic apparatus is falling when the first determination unit detects that output from the noise removal unit is equal to or less than the first acceleration, or when the second determination unit determines that output from the noise removal unit is equal to or less than the second acceleration.

9 Claims, 10 Drawing Sheets

FALL DETECTION APPARATUS

BACKGROUND OF THE INVENTION

1. Field of the Invention

The present invention relates to a fall detection apparatus more specifically, an apparatus that detects a fall by detecting acceleration.

2. Description of the Related Art

In response to recent needs for miniaturization of a reproducing device and a recording device, and increased recording capacity, a portable apparatus using a small-sized hard disk has been developed and commercialized.

For example, a hard disk is incorporated into portable apparatuses, notably a portable music player and a small-sized video camera, and contributes to realizing long-time reproduction and miniaturization of the apparatus.

On the other hand, as opportunities for carrying out such portable apparatuses including miniaturized devices have been increased, there are many cases where the apparatuses are damaged from accidental dropping or mishandling.

Japanese Patent Application Laid-Open No. 2003-263853 discusses a device which can prevent damages to a recording head and a disk face of a hard disk included in the device that is caused by accidental dropping or mishandling. The device prevents damages by retracting a head of the hard disk and stopping recording or reproducing in preparation for an impact coming from the fall of the apparatus.

The device discussed in Japanese Patent Application Laid-Open No. 2003-263853 uses an acceleration sensor to detect the drop.

The acceleration sensor includes a mass to detect gravity and a beam including a piezoelectric element to support the mass. However, such sensor has a specific resonant frequency determined by a structure including a mass and a beam.

When an external vibration agreeing with the resonant frequency of the acceleration sensor is applied to a device, the mass generates a resonant vibration and strongly vibrates. As a result, an output from the acceleration sensor increases.

Thus, when an external disturbance vibration of the resonant frequency is added to acceleration that is originally applied to an apparatus in the acceleration sensor, a detection amount of the sensor becomes greater than a detection amount of acceleration that is originally desired to be detected, under an influence of the resonant frequency. As a result, the accurate detection of acceleration cannot be performed.

FIG. 10 illustrates an example of frequency response of an acceleration sensor.

In FIG. 10, a horizontal axis in a graph indicates frequency, and a vertical axis indicates sensitivity.

When the characteristic of the graph is looked at, the output sensitivity is 0 dB which is proportional to acceleration up to about 400 Hz. However, the sensitivity gradually increases from about 400 Hz and has a peak greater than 20 dB at about 1.3 kHz. This remarkably high detection sensitivity is attributable to a resonance generated by the above-described structure of the sensor.

A vibration source causing a resonance is a driving vibration of an actuator such as a motor provided in the apparatus, a sound wave and vibration output from a speaker attached to the apparatus, vibration coming from an environment where the apparatus is used, and ambient sound.

SUMMARY OF THE INVENTION

The present invention is directed to an electronic apparatus which detects a fall of the apparatus by determining acceleration acting on the electronic apparatus and retracts a head of a hard disk or stops recording/reproducing to prepare for an impact so that damaging of a recording head or a disk surface can be prevented.

According to an aspect of the present invention, an electronic apparatus includes an acceleration detection unit to detect acceleration acting on the electronic apparatus, a noise removal unit to remove noise components from an output of the acceleration detection unit, a first determination unit to determine whether an output from the noise removal unit is equal to or less than a first acceleration, a second determination unit to determine whether the output from the acceleration detection unit is equal to or less than a second acceleration, a fall state determination unit to determine that the electronic apparatus is falling when the first determination unit detects that the output is a value indicating acceleration equal to or less than the first acceleration, or when the second determination unit detects that the output is a value indicating acceleration equal to or less than the second acceleration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

A digital camera as an electronic apparatus according to the embodiment of the present invention has three acceleration sensors crossing orthogonally, which detect gravity applied to the digital video camera and remove noise superimposed on an output signal of each acceleration sensor.

An acceleration signal from each acceleration sensor is used by a first fall determination circuit to determine whether the digital video camera is starting a fall. Simultaneously, an acceleration signal from a noise removal circuit is used by a second fall determination circuit to determine whether the digital video camera is starting a fall. When one of the first and second fall determination circuits determines the fall is starting, the digital video camera shifts to an impact resistance state.

First Exemplary Embodiment

Figure 1:
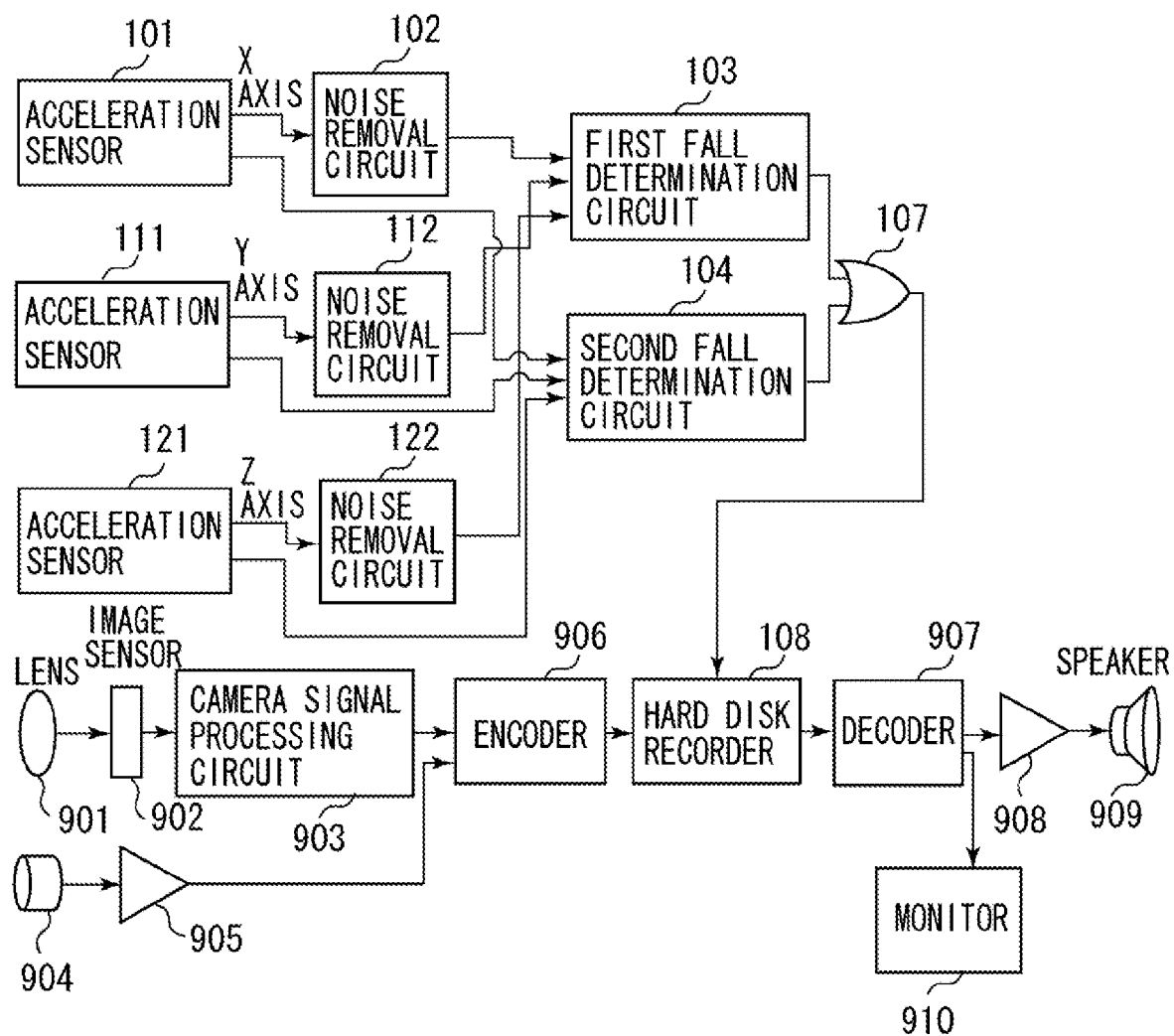
FIG. 1 is a block diagram illustrating a configuration of a recording/reproducing apparatus according to a first exemplary embodiment of the present invention.

FIG. 1 is a block diagram illustrating a configuration of a digital video camera according a first exemplary embodiment of the present invention.

Acceleration sensors 101, 111, and 121 detect accelerations acting on the digital video camera and are arranged to detect accelerations in three axial directions of an X axis, a Y axis, and a Z axis which orthogonally cross with each other.

Noise removal circuits 102, 112, and 122 remove noise components when resonant noise caused by an external disturbance, such as a vibration, overlaps with acceleration signals generated by the acceleration sensors 101, 111, and 121. The Noise removal circuits 102, 112, and 122 output noise-removed acceleration signals respectively.

A first fall determination circuit 103 determines that a fall of the digital video camera starts when each maximum value of the noise removed acceleration signals from the noise removal circuits 102, 112, and 122 indicates acceleration of equal to or less than 0.4 G.

A second fall determination circuit 104 determines that a fall of the digital video camera starts when each maximum value of the noise removed acceleration signals from the acceleration sensors 101, 111, and 121 indicates acceleration equal to or less than 0.4 G.

An OR circuit 107 calculates logical sums and outputs a calculated result as a falling state when one of the first fall determination circuit 103 and the second fall determination circuits 104 determines that the fall is starting.

An image sensor 902 such as a charge coupled device (CCD) photoelectrically converts an image formed by the imaging lens 901. A camera signal processing circuit 903 converts the image signal acquired by the image sensor 902 to a standard video signal.

An amplifier 905 amplifies voltage of a microphone 904. An encoder 906 encodes the standard video signal and an audio signal to the record data which are recordable in a memory such as a hard disk. A hard disk recorder 108 records/reproduces the standard video signal and the audio signal which are converted to the record data.

A decoder 907 decodes the data reproduced by a hard disk recorder 108 into the standard video signal and the audio signal. An amplifier 908 amplifies the decoded audio signal. A speaker 909 reproduces the amplified audio signal. A monitor 910 reproduces the decoded standard video signal.

The acceleration signals detected by the acceleration sensors 101, 111, and 121 are input into the noise removal circuits 102, 112, and 122. The sensors are attached to the digital video camera with each detection axis orthogonally crossing with each other. The noise removal circuits 102, 112, and 122 remove noise overlapping with the input acceleration signals using a method described below.

The noise removed acceleration signals are input into the first fall determination circuit 103. On the other hand, the acceleration signals output from the acceleration sensors 101, 111, and 121 are input into the second fall determination circuit 104.

The first and second fall determination circuits 103 and 104 detect whether each input acceleration signal indicates a value of equal to or less than 0.4 G (a predetermined value) When all three input acceleration signals indicate a value of equal to or less than 0.4 G, the first and second fall determination circuits 103 and 104 determine that the digital video camera is starting a fall.

When an apparatus to which the acceleration sensors 101, 111, and 121 are attached is stable and acceleration applied to the apparatus is only gravitational acceleration, one of the output of the acceleration sensors 101, 111, and 121 having the orthogonal three axes is greater than 0.7 G. Thus, when all of these outputs are equal to or less than 0.4 G, it can be said that the apparatus itself is under an influence of acceleration due to a fall.

However, in order to reduce an error of a fall determination due to swinging of the apparatus by a user and the like, the first and second fall determination circuits 103 and 104 can determine a falling state only when the condition that all input acceleration signals are equal to or less than 0.4 G, continues for a predetermined time or more, or when such a condition is generated two or more times.

When either or both of the first fall determination circuit 103 and the second fall determination circuit 104 determine that the fall starts, the OR circuit 107 calculates logical sums and outputs a determined result of a falling state.

When either or both of the first fall determination circuit 103 and the second fall determination circuit 104 determine that the apparatus is falling as described above, the hard disk recorder 108 shifts to an impact resistance state.

More particularly, when the hard disk recorder 108 is recording or reproducing data, the hard disk recorder 108 stops recording or reproducing operation and shifts a recording head to a retracting position.

The retracting position of the recording head is a movable position of the head where the head does not contact a magnetic disk even when a hard disk recording the magnetic data has an impact.

Further, when the falling is determined, recording and reproducing units (not illustrated) may also continuously stop the recording or reproducing in response to the falling determination.

Then, operations in recording and reproducing will be described. An operation in recording will be described at first. A luminous flux (photographic light) incident on the lens 901 forms an image on the image sensor 902 and is photoelectrically converted. A video signal output from the image sensor 902 is converted to a digital signal by, for example, an analog-to-digital (A/D) converter (not illustrated), and input in a camera signal processing circuit 903. A camera signal processing circuit 903 subjects the input image signal to a signal processing, such as forming a luminance signal or a color signal, so as to form a standard video signal. The microphone 901 converts a surrounding noise to an electric signal and the amplifier 905 amplifies the electric signal to have predetermined voltage so as to generate an audio signal.

The encoder 906 encodes the standard video signal and the audio signal to generate data which can be recorded in the hard disk recorder 108. The hard disk recorder 108 starts and stops recording by operation of a recording switch (not illustrated).

Then, in reproducing the signal, the hard desk recorder 108 reads out the data stored therein and the decoder 907 decodes the read data to a standard video signal and an audio signal. The amplifier 908 amplifies the decoded audio signal and the speaker 909 reproduces the audio signal as an audio. The monitor 910 reproduces the standard video signal acquired from the decoder 907. The recording operation and the reproducing operation can be changed by a recording/reproducing change switch (not illustrated).

Figure 2:
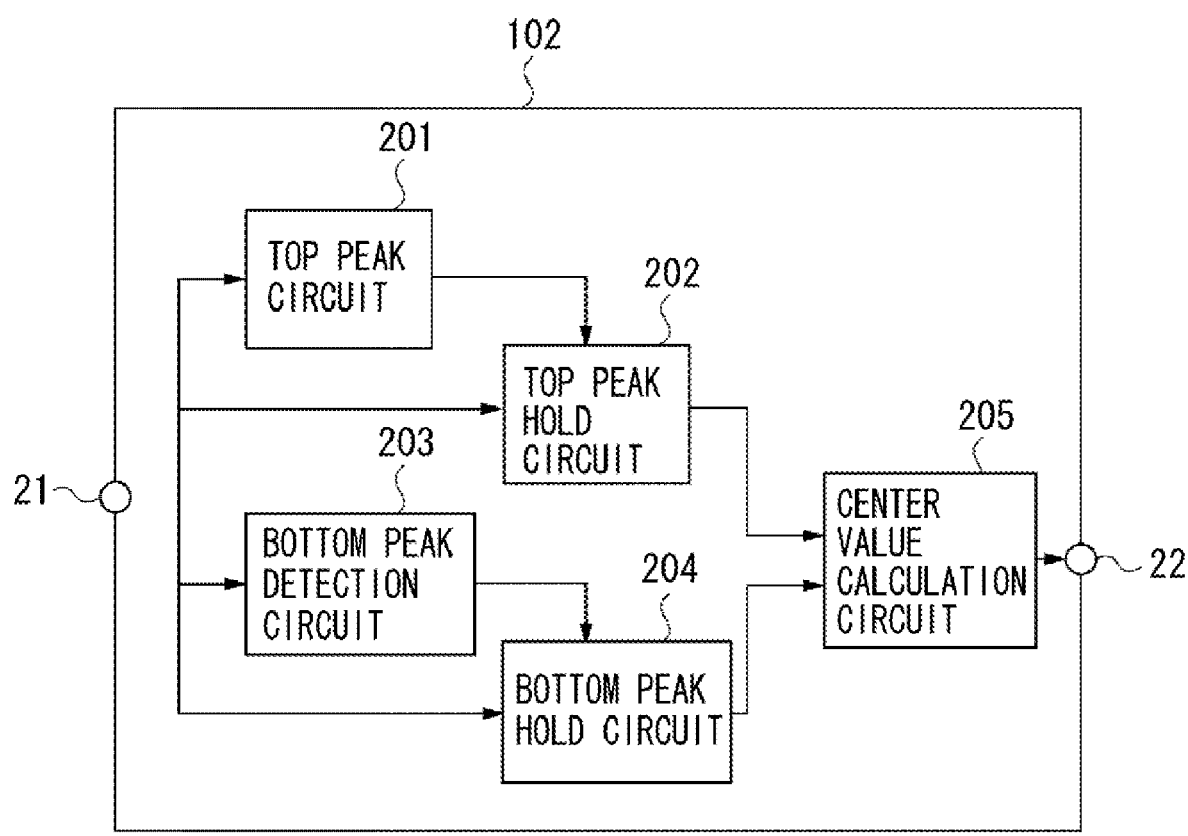
FIG. 2 is a diagram illustrating a noise removal circuit according to the first exemplary embodiment of the present invention.

Next, operations of the noise removal circuits 102, 112, and 122 will be described with reference to FIG. 2.

All of the noise removal circuits 102, 112, and 122 have a similar configuration. An input terminal 21 is a terminal of the noise removal circuit 102 and an acceleration signal acquired from the acceleration sensor 101 is input into the terminal 21.

A top peak detection circuit 201 detects a peak on the positive side of the input acceleration signal. When the top peak detection circuit 201 detects the peak on the positive side, it outputs a top peak detection signal. For example, an apex where an input signal level changes from increasing to decreasing can be detected.

A top peak hold circuit 202 holds an acceleration signal at a time of detecting the top peak in the top peak detection circuit 201. The top peak hold circuit 202 is simultaneously updated when a peak (top peak) value on the positive side of the input acceleration signal is detected.

A bottom peak detection circuit 203 detects a peak on the negative side of the input acceleration signal. When the bottom peak detection circuit 203 detects the peak on the negative side, it outputs a bottom peak detection signal.

As for a detecting method of the peak on the negative side, for example, an apex where an input signal level changes from decreasing to increasing can be detected.

A bottom peak hold circuit 204 holds an acceleration signal at a time of detecting the bottom peak in the bottom peak detection circuit 201. The bottom peak hold circuit 204 is simultaneously updated when a peak (bottom peak) value on the negative side of the input acceleration signal is detected.

A center value calculation circuit 205 calculates a center value between a value held in the top peak hold circuit 202 and a value held in the bottom peak hold circuit 204.

More specifically, the center value can be acquired by the following calculation:

Center value=(Top peak value−bottom peak value)/2+ bottom peak value

An output terminal 22 of the noise removal circuit 102 outputs the calculated center value.

Figure 3:
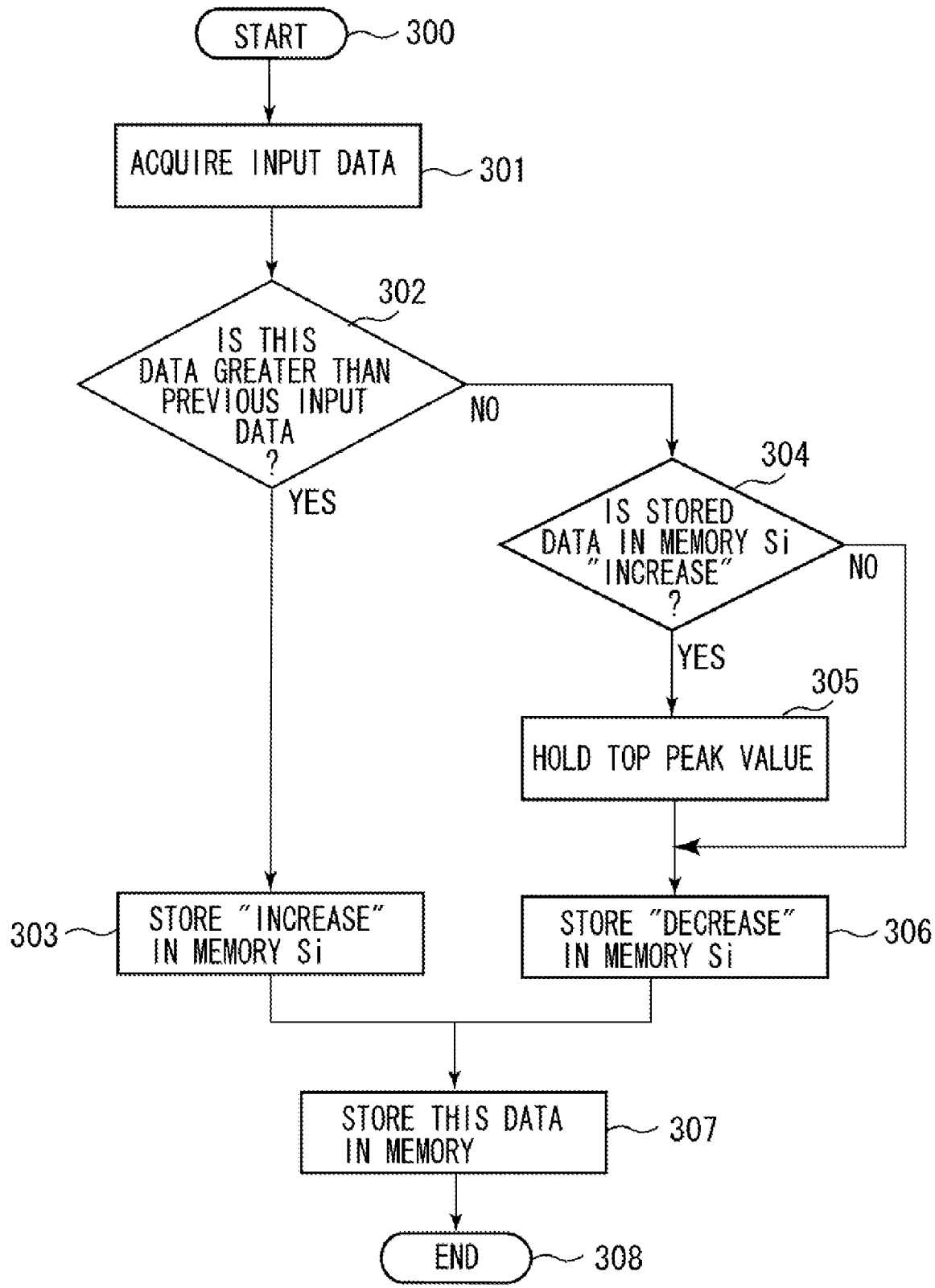
FIG. 3 is a flowchart illustrating an operation of a noise removal circuit according to the first exemplary embodiment of the present invention.

Next, processing of the noise removal circuit 102, 112, or 122 will be described with reference to a flowchart in FIG. 3. Detecting of a top peak will be described at first.

In step 300, the flow for the processing starts, and the processing is performed at a cycle which is higher enough than frequency detectable by the acceleration sensors 101, 111, and 121.

In step 301, the noise removal circuit 102, 112, or 122 samples and acquires an acceleration signal input from the input terminal 21.

In step 302, the noise removal circuit 102, 112, or 122 determines whether a value of the acceleration signal input at this time is greater than a value of a previously input acceleration signal stored in a memory in the top peak detection circuit 201. When the value of the acceleration signal input at this time is greater than the value of the previously input acceleration signal stored in the memory in the top peak detection circuit 201 (YES in step 302), the processing proceeds to step 303. When the value of the acceleration signal input at this time is equal to or less than the value of the previously input acceleration signal stored in the memory in the top peak detection circuit 201 (NO in step 302), the processing proceeds to step 304.

In step 303, the noise removal circuit 102, 112, or 122 stores "INCREASE" as a value in a memory Si in the top peak detection circuit 201.

In step 304, the noise removal circuit 102, 112, or 122 confirms whether the stored value in the memory Si is "INCREASE". When the stored value in the memory Si is "INCREASE" (YES in step 304), the processing proceeds to step 305. When the stored value in the memory Si is not "INCREASE" (NO in step 304), the processing proceeds to step 306.

In step 305, since the acceleration signal is lower than the previously sampled value as a result of step 302 and the value in the memory Si is "INCREASE" as a result of previous step 302, the noise removal circuit 102, 112, or 122 can determine that the acceleration signal indicates an apex at which the acceleration changes from increasing to decreasing. Therefore, the noise removal circuit 102, 112, or 122 updates and holds the present acceleration signal value in the top peak hold circuit 203.

In step 306, the noise removal circuit 102, 112, or 122 stores "DECREASE" as a value in the memory Si in the top peak detection circuit 201.

In step 307, the noise removal circuit 102, 112, or 122 stores the value of the acceleration signal input at this time in a memory in the top peak detection circuit 201.

In step 308, the flow ends.

By repeating the operation of this flow, the noise removal circuit 102, 112, or 122 can acquire a top peak value corresponding to change of acceleration signals.

Further, by interchanging above described increasing and decreasing, the noise removal circuit 102, 112, or 122 can acquire a bottom peak value corresponding to the change of acceleration signals.

Therefore, the noise removal circuit 102, 112, or 122 can acquire a center value between the top peak value held in the top peak hold circuit 202 and a bottom peak value held in the bottom peak hold circuit 204 in the center value calculation circuit 205.

Next, a signal wave shape when any one of output signals of the acceleration sensors 101, 111, and 121 before and after the fall is influenced by a resonance will be described with references to FIG. 4.

Figure 4:
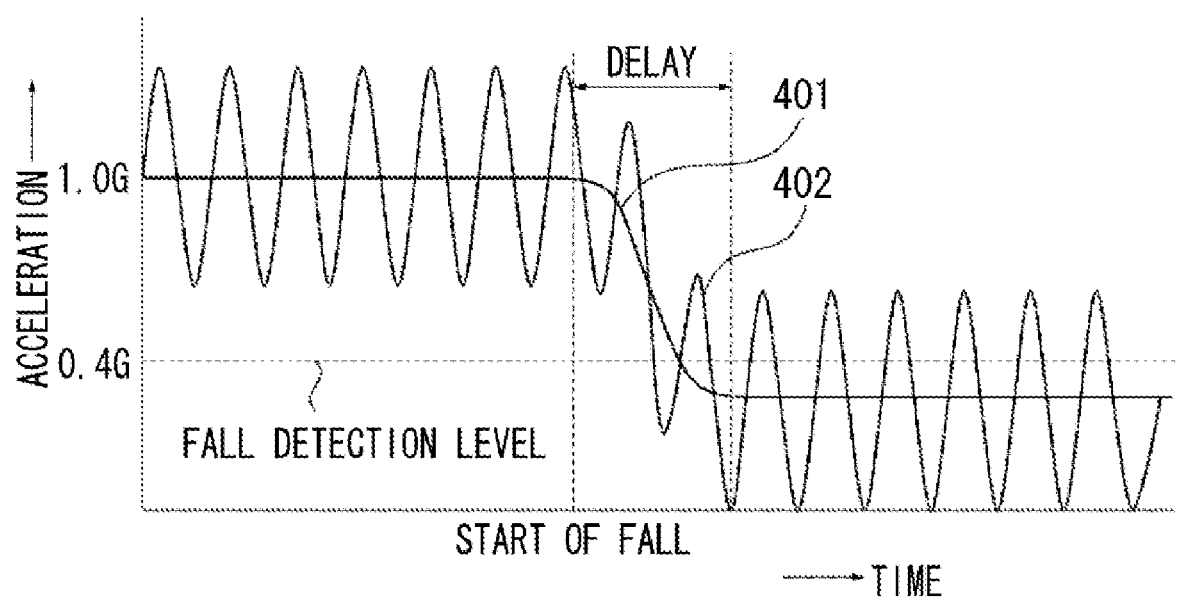
FIG. 4 is a graph illustrating how an output of an acceleration sensor is influenced by a resonant vibration.

In the graph illustrated in FIG. 4, a horizontal axis indicates a time and a vertical axis indicates acceleration. The graph illustrates one of output of acceleration sensors on three axes for convenience sake and a case where a detection axis approximately agrees with a vertical direction.

In the graph illustrated in FIG. 4, an acceleration signal 401 is in a normal state which is not under influence of a resonance. Before "START OF FALL" indicated on the time axis, a detection output of one of the acceleration sensors 101, 111, and 121 whose detection axis agrees with the vertical direction is approximately equal to 1.0 G which is a gravitational acceleration.

Further, after "START OF FALL", the output of the acceleration sensor, which is 1 G before "START OF FALL", comes close to 0 G. However, this output may not reach 0 G due to influence of rotation of an apparatus during the fall or a detection error of the acceleration sensor.

Further, "FALL DETECTION LEVEL" indicated on the vertical axis of the graph in FIG. 4 is 0.4 G. After "START OF FALL", the apparatus is determined to be in a falling state when the acceleration signal becomes equal to or less than this level. Thus, in a normal acceleration signal not influenced by a resonance, the falling state can be normally determined after "START OF FALL".

A change of an acceleration signal acquired from an acceleration sensor is delayed, which is caused by a response characteristic of the acceleration sensor.

Then, an acceleration signal influenced by a resonance will be described.

In the graph illustrated in FIG. 4, an acceleration signal 402 is an output signal of an acceleration sensor influenced by a resonance. The level of the acceleration signal 402 is changed due to acceleration. However, since the acceleration signal 402 is largely influenced by overlapping frequency of a resonance, the acceleration signal 402 oscillates centering on 0.4 G which is "FALL DETECTION LEVEL". Therefore, the acceleration signal 402 cannot constantly stay lower than the fall detection level. Thus, even when a digital video camera is in a falling state, the falling state and a non-falling state are repeatedly reversed, and thus the falling state cannot be correctly determined.

Next, a process in which the noise removal circuit 102, 112, or 122 can remove a noise component in a output signal of the acceleration sensors 101, 111, or 121 will be described with reference to the graph illustrated in FIG. 5. The output signal of the acceleration sensors 101, 111, or 121 is influenced by a resonance so as to overlap with resonant frequency.

Figure 5:
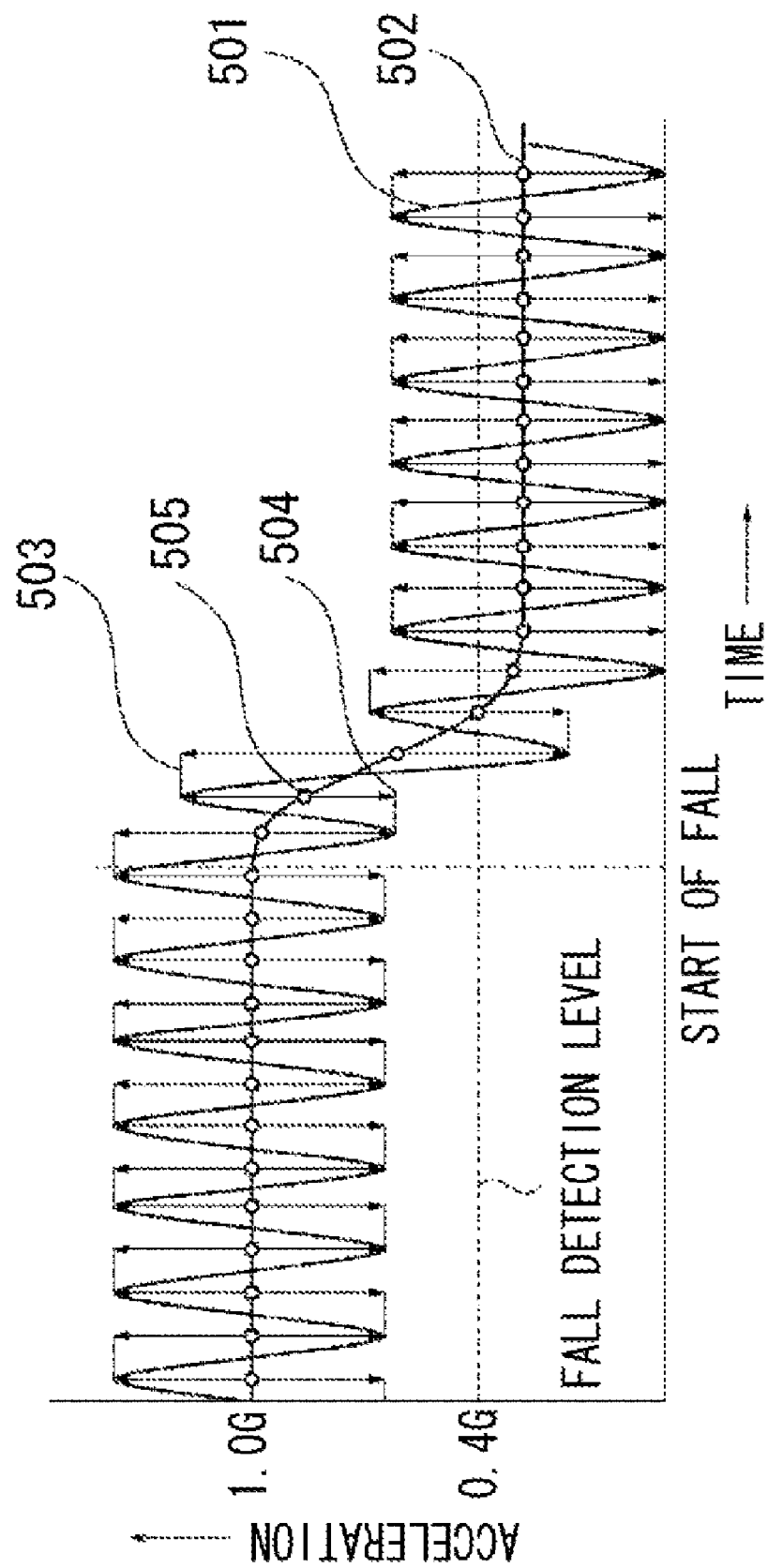
FIG. 5 is a graph illustrating an acceleration signal when a noise removal circuit according to the first exemplary embodiment of the present invention removes a resonant frequency noise from an acceleration signal on which the resonant frequency is superimposed.

In the graph illustrated in FIG. 5, a horizontal axis indicates a time, and a vertical axis indicates acceleration.

The graph illustrated in FIG. 5 is similar to the graph illustrated in FIG. 4 and illustrates an detection output of one of acceleration sensors 101, 111, and 121 whose detection axis agrees with the vertical direction.

In FIG. 5, an acceleration signal 501 is an output signal of an acceleration sensor influenced by a resonance and corresponds to the acceleration signal 402 in FIG. 4.

A top peak value 503 is held by the top peak hold circuit 202 in the noise removal circuit. The noise removal circuit is connected with one of acceleration sensors 101, 111, and 121 which have the detection axis agreeing with the vertical direction. The top peak value 503 can be acquired at each top peak of a resonant wave shape.

A bottom peak value 504 is held by the bottom peak hold circuit 204 of the noise removal circuit. The noise removal circuit is connected with one of acceleration sensors 101, 111, and 121 which have the detection axis agreeing with the vertical direction. The bottom peak value 504 can be acquired at each bottom peak of a resonant wave shape.

A center value 505 is a value between the top peak value 503 and the bottom peak value 504 acquired by the center value calculation circuit 205.

An acceleration signal 502 is a line connecting the center values 505 and obtained as a result of a calculation by the noise removal circuit.

Figure 6:
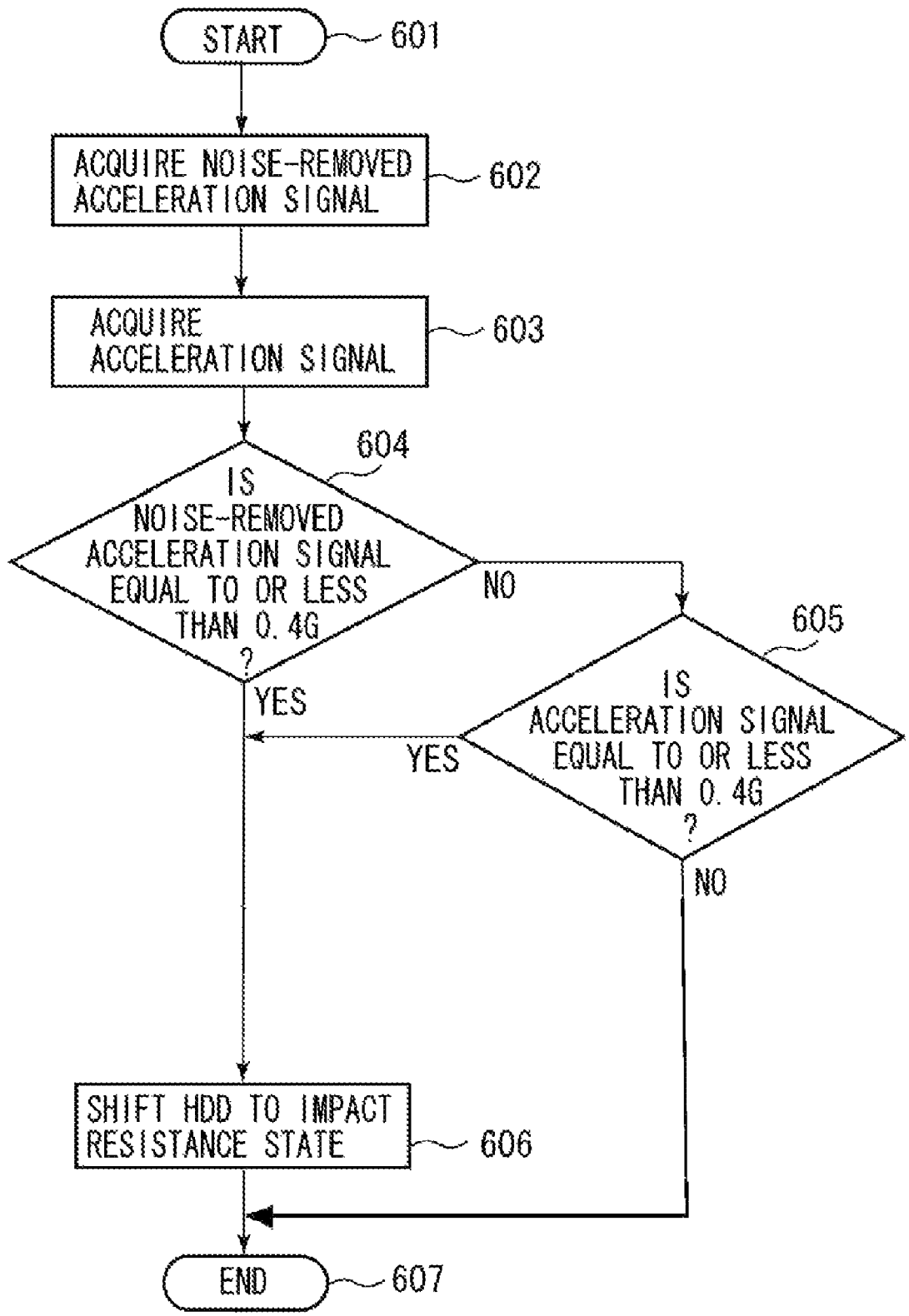
FIG. 6 is a flowchart illustrating an operation according to the first exemplary embodiment of the present invention.

Operations of the first fall determination circuit 103, the second fall determination circuit, and the OR circuit 107 will be described with reference to the flowchart in FIG. 6.

In step 601, the flow for the processing starts and the processing is performed in a cycle in which acceleration signals from the noise removal circuit 102, 112, and 122 are sampled.

In step 602, the first fall determination circuit 103 samples noise-removed acceleration signals acquired from the noise removal circuit 102, 112, and 122.

In step 603, the second fall determination circuit samples acceleration signals acquired from the acceleration sensors 101, 111 and 121.

In step 604, the first fall determination circuit 103 determines whether the noise-removed acceleration signals acquired from each noise removal circuit 102, 112, or 122 are a value indicating acceleration of equal to or less than 0.4 G that determines a falling start state. When the noise-removed acceleration signals acquired from each noise removal circuits 102, 112, or 122 are the value indicating acceleration of equal to or less than 0.4 G (YES in step 604), the processing proceeds to step 606. When the noise removed acceleration signals acquired from each noise removal circuit 102, 112, or 122 are the value indicating acceleration greater than 0.4 G (NO in step 604), the processing proceeds to step 605.

In step 605, the second fall determination circuit determines whether the acceleration signals acquired from each acceleration sensor 101, 111, or 121 are a value indicating acceleration equal to or less than 0.4 G that determines the falling start state. When the acceleration signals acquired from each acceleration signal acquired from each acceleration sensor 101, 111, or 121 are a value indicating acceleration equal to or less than 0.4 G (YES in step 605), the processing proceeds to step 606. When the acceleration signals acquired from each acceleration sensor 101, 111, or 121 are a value indicating acceleration greater than 0.4 G (NO in step 605), the processing proceeds to step 607.

In step 606, the OR circuit 107 determines that a result of the fall determination is "IN FALL STATE" and shifts the hard disk recorder 108 to an impact resistance state.

In the present exemplary embodiment, both fall determination acceleration of the first fall determination circuit 103 and the fall determination acceleration of the second fall determination circuit 104 are equal to or less than 0.4 G. However, the values of the fall determination acceleration in the first fall determination circuit 103 can be different from that of the fall determination acceleration in the second fall determination circuit 104.

In particular, according to the present exemplary embodiment, the first fall determination circuit 103 detects and calculates the peak value of the acceleration signal input therein during the noise removing process in the noise removal circuit 102, 103 and 104. Consequently, the detection of the peak value and the calculation time are slightly delayed comparing with the outputs of the acceleration sensors 101, 111, and 121.

While the calculation time is delayed, a falling state continues during the delayed time, and thus a remaining time allowed for shifting to the impact resistance state becomes shorter. Furthermore, at worst, the shifting to the impact resistance state may not be completed before the impact occurs.

Thus, in order to prevent delaying of fall detection, it is effective that the fall determination acceleration in the first fall determination circuit 103 is set to about 0.45 G or 0.5 G that is greater than the fall determination acceleration in the second fall determination circuit 104.

Accordingly, in the digital video camera according to the first exemplary embodiment, acceleration signals acquired from each acceleration sensor are used by a first fall determination circuit to determine whether the acceleration signals indicate a falling start state. In addition, acceleration signals acquired from each noise removal circuit are simultaneously used by a second fall determination circuit to determine whether the acceleration signals indicate a falling start state. When any one of the first and second fall determination circuits determines "START OF FALL STATE", the digital video camera is shifted to the impact resistance state. In this way, even when a resonant frequency overlaps with an output signal of an acceleration sensor caused by an external disturbance such as vibration, the digital video camera can detect an acceleration signal that is to be originally detected. Therefore, the digital video camera can retract a head of a hard disk and stop recording/reproducing to prepare for an impact that will be coming. Thus, damaging of a recording head or a disk surface can be prevented.

Second Exemplary Embodiment

In the second exemplary embodiment, noise removal circuits perform noise removal processing using a peak value and bottom value per unit time. In addition, when a speaker voice is not output, the second exemplary embodiment performs a fall determination without performing noise removal processing by the noise removal circuits. In this point, the second exemplary embodiment is different from the first exemplary embodiment.

Figure 7:
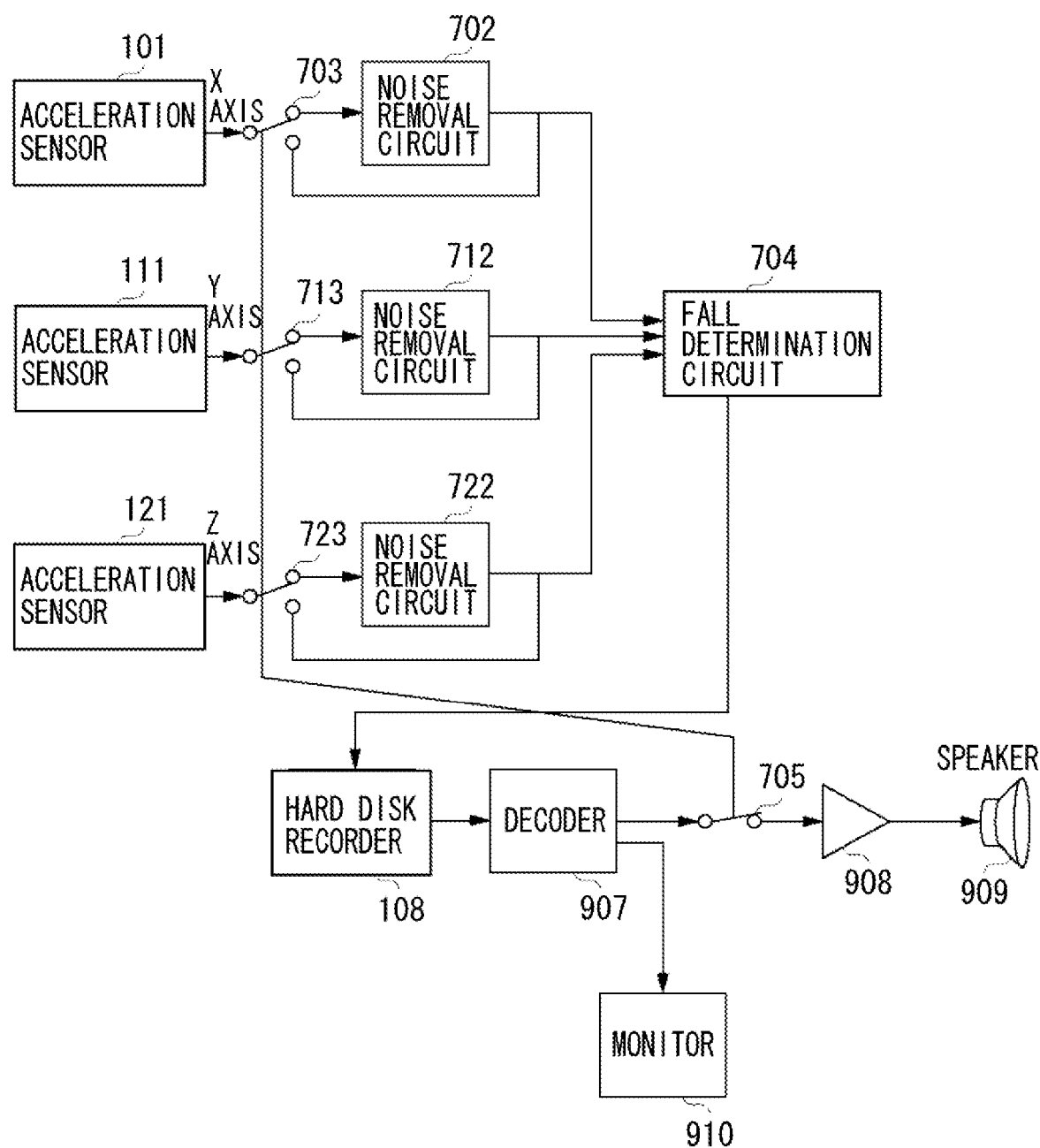
FIG. 7 is a block diagram illustrating a configuration of a recording/reproducing apparatus according to a second exemplary embodiment of the present invention.

FIG. 7 is a block diagram illustrating a configuration of a digital video camera as an electronic apparatus according to the second exemplary embodiment.

In FIG. 7, acceleration sensors 101, 111, and 121 are arranged in the detection axis directions which orthogonally cross with three axes of X, Y and Z.

Noise removal circuits 702, 712, and 722 remove noise components when a resonant noise overlaps due to a disturbance vibration with acceleration signals acquired from the acceleration sensors 101, 111, and 121, and output a noise removed acceleration signal respectively.

Noise removal change switches 703, 713, and 723 are linked with an audio switch 705 and operable to select whether the acceleration signals acquired from the acceleration sensors 101, 111, and 121 are output to the noise removal circuits 702, 712, and 722 or to the fall determination circuit 103.

A fall determination circuit 704 determines that a digital video camera is falling when a maximum value of an input acceleration signal or a maximum value of noise removed acceleration signal indicates acceleration of equal to or less than 0.4 G.

A hard disk recorder 108 records/reproduces a standard video signal and an audio signal which are converted to recording data.

A decoder 907 decodes the standard video signal and the audio signal from the data reproduced by the hard disk recorder 108.

An audio switch 705 is operable to turn ON/OFF an audio output of a speaker 909 and can change the audio output in association with the noise removal change switches 703, 713, and 723.

An amplifier 908 amplifies the decoded audio signal.

A speaker 909 is attached to an apparatus which reproduces the amplified audio signal.

A monitor 910 reproduces the decoded standard video signal.

The acceleration signals detected by the acceleration sensors 101, 111, and 121 are inputted into the noise removal circuits 702, 712, and 722 via noise removal change switches 703, 713 and 723. The acceleration sensors 101, 111, and 121 are arranged to orthogonally cross with each other. The noise removal circuits 702, 712, and 722 remove a noise overlapping with the input acceleration signals as will be described below.

The noise removed acceleration signals or the accelerations signals acquired from the acceleration sensors 101, 111, and 121 are inputted in the fall determination circuit 704. The accelerations signals acquired from the acceleration sensors 101, 111, and 121 are selected by the noise removal change switches 703, 713 and 723.

The fall determination circuit 704 detects whether each inputted acceleration signal indicates a value of greater than 0.4 G (a predetermined value) or equal to or less than 0.4 G. When all three input acceleration signals indicate a value of equal to or less than 0.4 G, the fall determination circuit 704 determines that the digital video camera is falling.

When an apparatus to which the acceleration sensors 101, 111, and 121 are attached is stable and acceleration applied to the apparatus is only a gravitational acceleration, any one of outputs from the acceleration sensors 101, 111, and 121 whose three axes orthogonally cross with each other is greater than 0.7 G. Thus, when all of the outputs of the acceleration sensors 101, 111, and 121 are equal to or less than 0.4 G, the apparatus itself is under the influence of acceleration due to a fall.

When the fall determination circuit 704 determines that the apparatus is falling, the hard disk recorder 108 shifts to an impact resistance state.

More particularly, the hard disk recorder 108 stops a reproducing operation of data and shifts a recording head to a retracting position.

The head retracting position is a movable position where the head does not contact a magnetic disk in which magnetic data is recorded when a hard disk has an impact.

The decoder 907 decodes recording data read by the hard disk recorder 108 to a standard video signal and an audio signal.

The amplifier 908 amplifies the decoded audio signal via the audio switch 705 and the speaker 909 reproduces the audio signal as an audio.

The monitor 910 reproduces an imaged video of the standard video signal acquired from the decoder 907.

At this time, if an audio is not output (the speaker 909 is not operated), the audio switch 705 is operated to assume an OFF (canceled) state, for example, by a user.

The audio switch 705 is operated in association with the noise removal change switches 703, 713, and 723. When the audio switch 705 is in the OFF state, the noise removal change switches 703, 713, and 723 are changed to directly input the acceleration signals acquired from the acceleration sensors 101, 111, and 121 into the fall determination circuit 704. That is, the noise removal circuits 702, 712, and 722 are bypassed.

On the other hand, if the audio is output (the speaker 909 is operated), the audio switch 705 is operated to assume an ON (connecting) state, for example, by a user.

When the audio switch 705 is in the ON state, the noise removal change switches 703, 713, and 723 are operated to input the acceleration signals acquired from the acceleration sensors 101, 111, and 121 into the noise removal circuits 702, 712, and 722. Then, the noise-removed acceleration signals output from the noise removal circuits 702, 712, and 722 are input into the fall determination circuit 704.

This process is performed, considering that an audio from the speaker 909 transmits a vibration or a sound wave to the acceleration sensors 101, 111, and 121. Namely, it is considered that the audio frequency from the speaker 909 includes resonant frequency which influences the acceleration sensors 101, 111, and 121. In this case, as to the acceleration signals acquired from the acceleration sensors 101, 111, and 121, resonant frequency signals are superimposed on the acceleration signals which are originally desired to be detected.

Therefore, when the output of the speaker 909 is valid by an operation of the audio change switch 705, the noise removal circuits 702, 712, and 722 remove the resonance frequency so that the acceleration signals to be originally detected can be acquired. Accordingly, the fall determination circuit 704 can correctly determine the falling start state.

Further, when the output of the speaker 909 is invalid by an operation of the audio change switch 705, an apparatus does not internally produce a resonant frequency. Thus, the acceleration signals from the acceleration sensors 101, 111, and 121 are directly input into the fall determination circuit 704.

Figure 8:
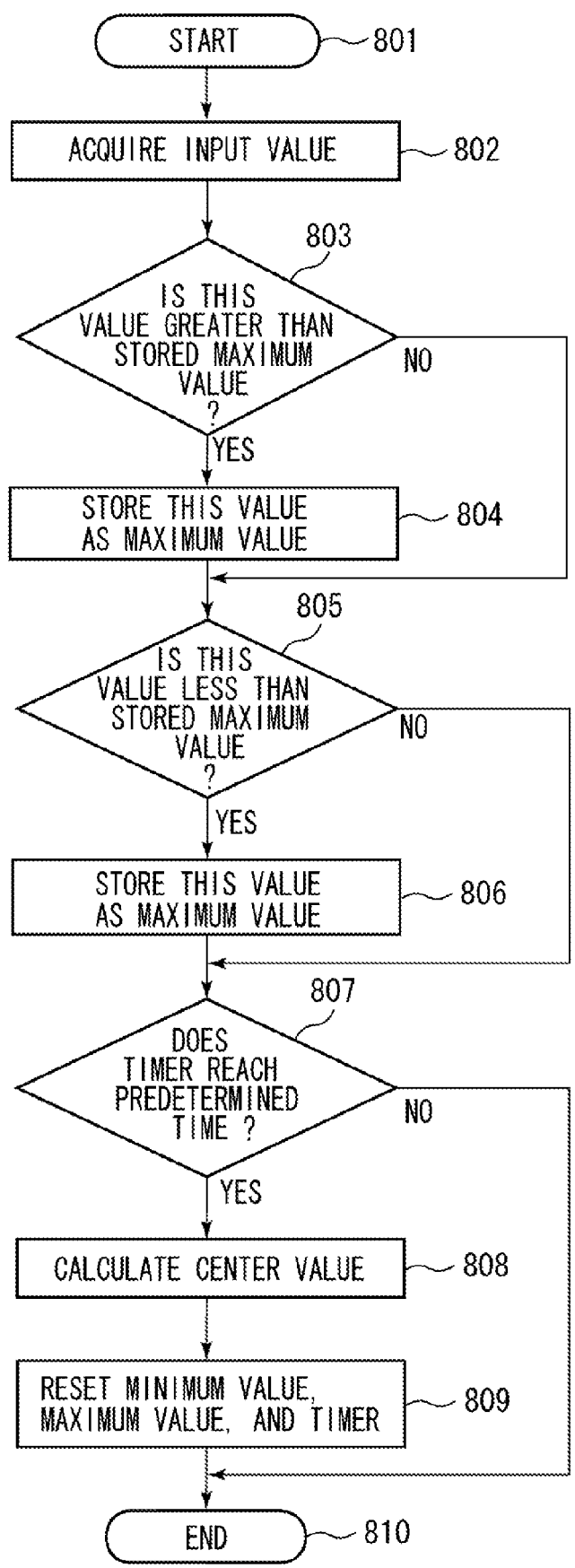
FIG. 8 is a flowchart illustrating an operation of a noise removal circuit according to the second exemplary embodiment of the present invention.

Next, operations of the noise removal circuits 702, 712, and 722 will be described with reference to the flowchart in FIG. 8.

Figure 9:
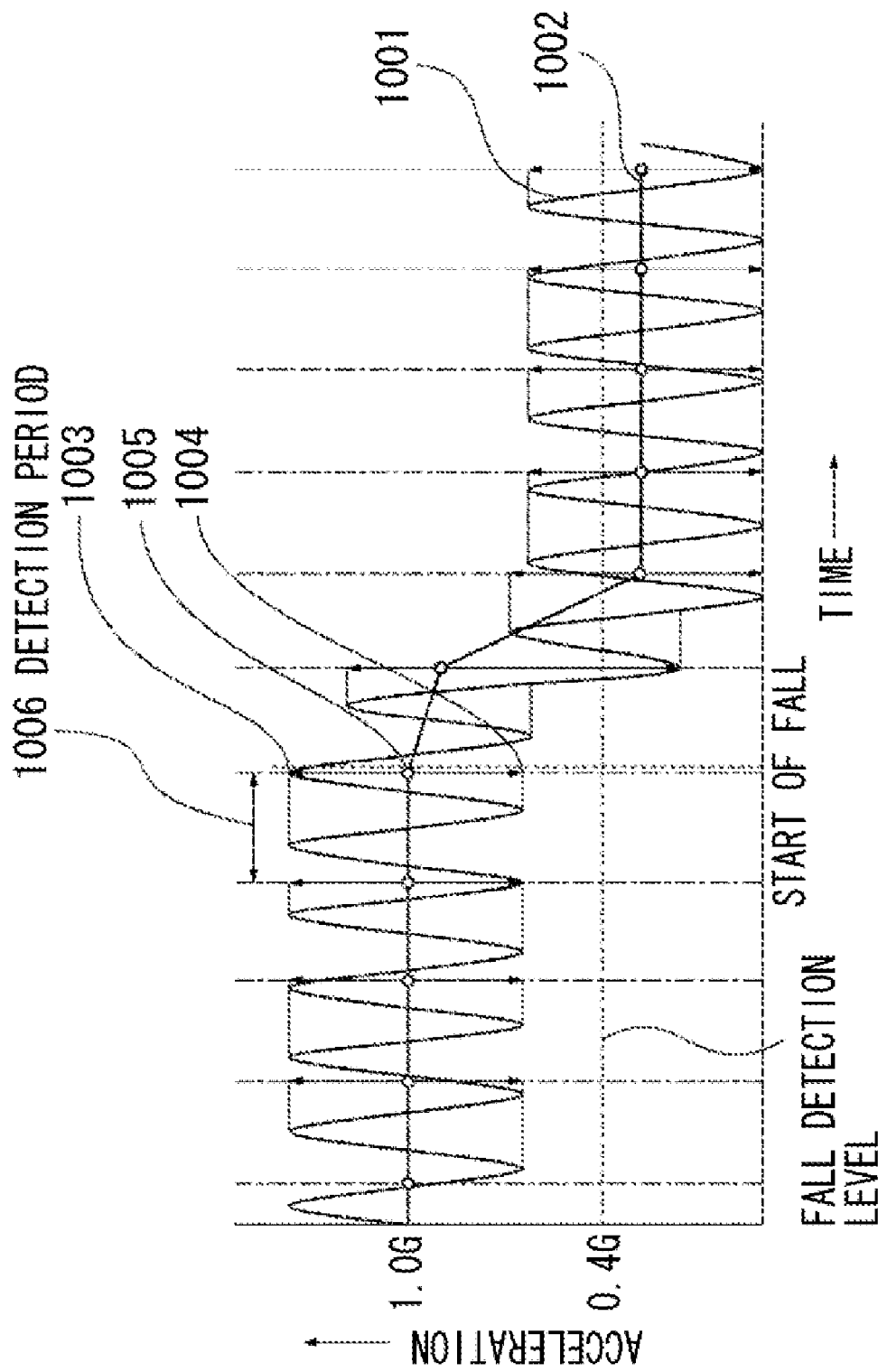
FIG. 9 is a graph illustrating an acceleration signal when a noise removal circuit according to the second exemplary embodiment of the present invention removes the resonant frequency noise from an acceleration signal overlapped with a resonant frequency.
Figure 10:
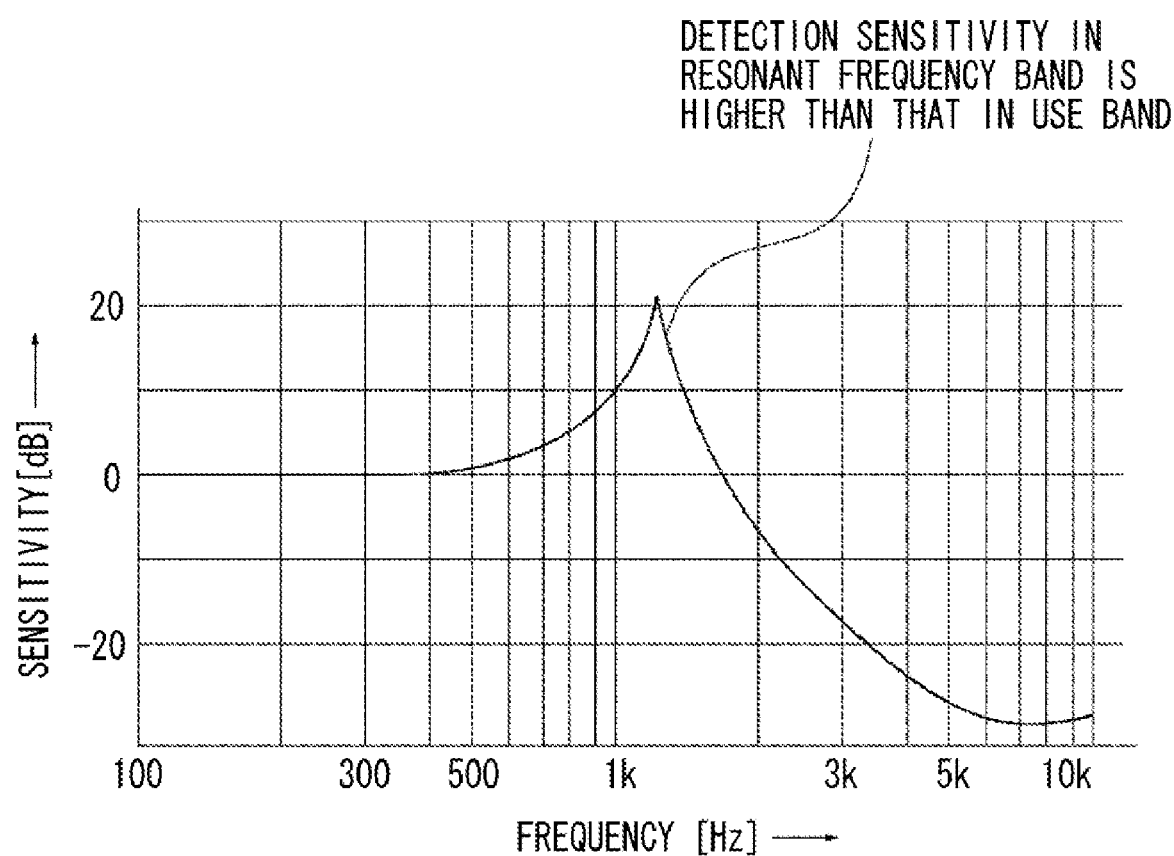
FIG. 10 is a graph illustrating an example of a frequency response of an acceleration sensor.

The operation of the noise removal circuits 702, 712, or 722 is to acquire a acceleration signal from which the resonance noise is removed, by obtaining a center value between a maximum value and a minimum value of an acceleration signal acquired within a previously set period (for instance detection period 1006 in FIG. 9). Thus, the previously set period is at least equal to or greater than one cycle of the resonant frequency.

In step 801, the flow for this processing starts. For example, the processing is performed at a cycle higher enough than detectable frequencies of the acceleration sensors 101, 111, and 121.

In step 802, the noise removal circuit 702, 712, or 722 samples and acquires an input acceleration signals.

In step 803, the noise removal circuit 702, 712, or 722 determines whether the input acceleration signal is greater than a value stored in an acceleration maximum value memory in the noise removal circuit 702, 712, or 722. When the input acceleration signal is greater than the value stored in the acceleration maximum value memory (YES in step 803), the processing proceeds to step 804. When the input acceleration signal is equal to or less than the value stored in the acceleration maximum value memory (NO in step 803), the processing proceeds to step 805.

In step 804, the noise removal circuit 702, 712, or 722 stores the value of the present acceleration signal in the acceleration maximum value memory to perform an update.

In step 805, the noise removal circuit 702, 712, or 722 determines whether the input acceleration signal is less than a value stored in an acceleration minimum value memory in the noise removal circuit 702, 712, or 722. When the input acceleration signal is less than the value stored in the acceleration minimum value memory (YES in step 805), the processing proceeds to step 806. When the input acceleration signal is not less than the value stored in the acceleration minimum value memory (NO in step 805), the processing proceeds to step 807.

In step 806, the noise removal circuit 702, 712, or 722 stores the value of the present acceleration signal in the acceleration minimum value memory to perform an update.

In step 807, the noise removal circuit 702, 712, or 722 determines whether a timer has reached a predetermined time. When the timer has reached the predetermined time (YES in step 807), the processing proceeds to step 808. When the timer has not reached the predetermined time (NO in step 807), the processing proceeds to step 810. The set time of the timer is the predetermined period which is at least equal to or greater than one cycle of a resonant frequency.

In step 808, the noise removal circuit 702, 712, or 722 calculates a center value. The formula for this calculation is as follows.

Center value=(Acceleration maximum value-acceleration minimum value)/2+acceleration minimum value In step 809, the noise removal circuit 702, 712, or 722 resets the acceleration minimum value, the acceleration maximum value, and the timer to initial values.

For example, the noise removal circuit 702, 712, or 722 sets the acceleration minimum value to 1 G, the acceleration maximum value to 0 G, and the timer to 0 second.

In step 810, the flow of the processing ends.

Accordingly, the noise removed acceleration signals can be acquired by the noise removal circuits 702, 712 and 722.

The graph illustrated in FIG. 9 indicates a detection output of an acceleration sensor which has a detection axis agreeing with the vertical direction among the acceleration sensors 101, 111, and 121. With reference to FIG. 9, it will be described that the noise removal circuits 702, 712, and 722 can remove noise components generated due to a resonance from an output of an acceleration sensor that overlaps with a resonant frequency.

In the graph illustrated in FIG. 9, the horizontal axis indicates a time, and the vertical axis indicates acceleration.

The graph illustrated FIG. 9, similar to the graph illustrated in FIG. 4, illustrates a detection output of an acceleration sensor which has a detection axis agreeing with the vertical direction among the acceleration sensors 101, 111, and 121.

In the graph illustrated in FIG. 9, an acceleration signal 1001 is an output signal of an acceleration sensor which has a detection axis agreeing with the vertical direction among the acceleration sensors 101, 111, and 121 and is under an influence of a resonance. The acceleration signal 1001 corresponds to the acceleration signal 402 in FIG. 4.

An acceleration maximum value 1003 is held in an acceleration maximum value memory in any one of the noise removal circuits 702, 712, and 722.

An acceleration minimum value 1004 is held in an acceleration minimum value memory in any one of the noise removal circuits 702, 712 and 722.

A center value 1005 is a value between the acceleration maximum value 1003 and the acceleration minimum value 1004.

An acceleration signal 1002 is a line connecting the center values 1005 and is an output from any one of the noise removal circuits 702, 712, and 722. A detection period 1006 is a predetermined period to acquire the acceleration maximum value 1003 and the acceleration minimum value 1004.

It is described in the present exemplary embodiment that the fall determination acceleration in the fall determination circuit 704 is equal to or less than 0.4 G regardless of whether the audio output change switch 705 is in the ON state or in the OFF state. However, the value of the fall determination acceleration of the fall determination circuit 704 can be different depending on the ON state or the OFF state of the audio output change switch 705.

In particular, according to the present exemplary embodiment, when the audio output change switch 705 is in the ON state, the peak values are detected and calculated during the noise removal process of the noise removal circuits 102, 103, and 104. Therefore, the detection of the peak value and the calculation time are slightly delayed comparing with the outputs of the acceleration sensors 101, 111, and 121.

If the calculation time is delayed, a falling state continues in the delayed time, and thus the remaining time allowed for shifting the hard disk recorder to the impact resistance state becomes shorter. Furthermore, at worst, the shifting to the impact resistance state may not be completed before the impact occurs. Thus, in order to decrease the delay time of the fall detection, it is effective that when the audio output change switch 705 is in the ON state, the fall determination acceleration is set to about 0.45 G or 0.5 G so as to be greater than the fall determination acceleration when the audio output change switch 705 is in the OFF state.

In the digital video camera according to the second exemplary embodiment, when the audio output change switch 705 is in the ON state, that is, when the speaker 909 outputs audio, the fall determination circuit 704 determines whether the digital video camera is falling, by the acceleration signal from which a resonant noise is removed by the noise removal circuits 702, 712, and 722. On the other hand, when the audio output change switch 705 is in the OFF state, that is, when the speaker 909 does not output an audio, the fall determination circuit 704 determines whether the digital video camera is falling, by the acceleration signals output from the acceleration sensors 101, 111, and 121.

Then, when any one of the results by the fall determination circuit 704 determines "START OF FALL", the digital video camera is shifted to the impact resistance state. Thus, even when resonant frequency overlaps with a signal output from an acceleration sensor due to disturbance of external vibration, an acceleration signal to be originally detected can be acquired. Therefore, the digital video camera can retract a head of a hard disk to prepare for an impact that will be coming and stop recording/reproducing accordingly. Thus, damaging of a recording head or a disk surface can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-197395 filed Jul. 30, 2007, which is hereby incorporated by reference herein in its entirety.

What is claimed is:

1. An electronic apparatus comprising:
an acceleration detection unit configured to detect acceleration acting on the electronic apparatus;
a noise removal unit configured to remove a noise component from an output of the acceleration detection unit;
a first determination unit configured to determine whether an output from the noise removal unit is a value indicating acceleration equal to or less than a first acceleration;
a second determination unit configured to determine whether the output from the acceleration detection unit is a value indicating acceleration equal to or less than a second acceleration; and
a fall state determination unit configured to determine that the electronic apparatus is falling when the first determination unit detects that the output from the noise removal unit is equal to or less than the first acceleration, or when the second determination unit detects that the output from the acceleration detection unit is equal to or less than the second acceleration.

2. The electronic apparatus according to claim 1, wherein the acceleration detection unit is configured to detect accelerations in three axes directions that orthogonally cross, wherein the first determination unit is configured to determine whether all accelerations detected by the acceleration detection unit, from which noise components are removed by the noise removal unit, are equal to or less than the first acceleration, and
wherein the second determination unit is configured to determine whether all accelerations detected by the acceleration detection unit are equal to or less than the second acceleration.

3. The electronic apparatus according to claim 1, wherein the noise removal unit acquires a top peak and a bottom peak from the output of the acceleration detection unit, and outputs a center value between the top peak and the bottom peak, and
wherein the first acceleration and the second acceleration are set to be the same value.

4. The electronic apparatus according to claim 1, wherein the first acceleration is set to a value greater than the second acceleration.

5. An electronic apparatus comprising:
a vibration generation unit;
an acceleration detection unit configured to detect acceleration acting on the electronic apparatus;
a noise removal unit configured to remove a noise component from an output of the acceleration detection unit; and
a fall state determination unit configured to determine that the electronic apparatus is falling when the output from the acceleration detection unit is a value indicating acceleration equal to or less than a first acceleration in a case of operating the vibration generation unit, and configured to determine that the electronic apparatus is falling when an output from the noise removal unit is a value indicating acceleration equal to or less than a second acceleration in a case of operating no vibration generation unit.

6. The electronic apparatus according to claim 5, wherein the acceleration detection unit is configured to detect accelerations in three axes directions that orthogonally cross, wherein the fall state determination unit determines that the electronic apparatus is falling by detecting whether all accelerations detected by the acceleration detection unit are equal to or less than the first acceleration or the second acceleration.

7. The electronic apparatus according to claim 5, wherein the vibration generation unit is an audio output unit.

8. The electronic apparatus according to claim 5, wherein the noise removal unit acquires a top peak and a bottom peak from the output of the acceleration detection unit, and outputs a center value between the top peak and the bottom peak, and
wherein the first acceleration and the second acceleration are set to the same value.

9. The electronic apparatus according to claim 5, wherein the first acceleration is set to a value greater than the second acceleration.

* * * * *